(12) United States Patent
Lee et al.

(10) Patent No.: US 8,861,658 B1
(45) Date of Patent: Oct. 14, 2014

(54) SIGNAL POWER ESTIMATION FOR CELLULAR OFDM SYSTEMS

(71) Applicant: Marvell International Ltd., Hamilton (BM)

(72) Inventors: Jungwon Lee, Cupertino, CA (US); Sayandev Mukherjee, Santa Clara, CA (US); Adina Matache, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 64 days.

(21) Appl. No.: 13/762,046

(22) Filed: Feb. 7, 2013

Related U.S. Application Data

(63) Continuation of application No. 13/484,043, filed on May 30, 2012, now Pat. No. 8,374,293, which is a continuation of application No. 12/116,885, filed on May 7, 2008, now Pat. No. 8,213,556.

(60) Provisional application No. 60/916,403, filed on May 7, 2007.

(51) Int. Cl.
*H03D 1/00* (2006.01)
*H04W 24/00* (2009.01)

(52) U.S. Cl.
CPC .................................. *H04W 24/00* (2013.01)

USPC ........... 375/343; 375/347; 375/346; 375/316; 375/219; 375/267

(58) Field of Classification Search
USPC .................. 375/343, 347, 316, 219, 260, 267
See application file for complete search history.

(56) References Cited

U.S. PATENT DOCUMENTS

| | | |
|---|---|---|
| 2007/0217534 A1 | 9/2007 | Lee et al. |
| 2007/0217552 A1 | 9/2007 | Lee et al. |
| 2008/0317150 A1 | 12/2008 | Alexander et al. |

*Primary Examiner* — Zewdu Kassa

(57) ABSTRACT

Signal power of a received signal, which has a plurality of preamble sequences associated with sub-carrier signals received from a plurality of sub-carriers, in a cellular Orthogonal Frequency Division Multiplexing system may be estimated by estimating as power for at least one preamble sequence of a signal received at a selected receive antenna. The preamble sequence is associated with a base station and a set of sub-carriers. A differential received signal developed for one of the set of sub-carriers is correlated with a normalized differential transmit signal for the preamble sequence, and the estimate of the power for the at least one preamble sequence is extracted based on the correlation.

20 Claims, 7 Drawing Sheets

Base 115

| Index | IDcell | Segment | Series to modulate (in hexadecimal format) |
|---|---|---|---|
| 0 | 0 | 0 | 0xA6F29453 7B285E1844677D133E4D53CCB1F182DE00489E53E6B6E77065C7EE7D0ADBEAF |
| 1 | 1 | 0 | 0x068321CBBE7F462E6C2A07E8BBDA2C7F7946D5F69E35AC8ACF7D64AB4A33C467001F3B2 |
| 2 | 2 | 0 | 0x1C75D30B2DF72CEC9117A0BD8EAF8E0502461FC07456AC906ADE03E9B5AB5E1D3F98C6E |
| 3 | 3 | 0 | 0x5F9A2E5CA7CC69A5227104FB1CC2262809F3B10D0542B9BDFDA4A73A7046096DF0E8D3D |
| 4 | 4 | 0 | 0x82F8A0AB918138D84BB86224F6C342D81BC8BFE791CA9EB54096159D672E91C6E13032F |
| 5 | 5 | 0 | 0xEE27E59B84CCF15BB1565EF90D478CD2C49EE8A70DE368EED7C9420B0C6FFAF9AF035FC |
| 6 | 6 | 0 | 0xC1DF5AE28D1CA6A8917BCDAF4E73BD93F931C44F93C3F12F0132FB643EFD5885C8B2BCB |
| 7 | 7 | 0 | 0xFCA36CCCF7F3E060269 6DF745A68DB948C57DFA9575BEA1F05725C42155 89F0A63A248 |

310 → Index
320 → IDcell
330 → Segment

FIG. 5

SIGNAL POWER ESTIMATION FOR CELLULAR OFDM SYSTEMS

RELATED APPLICATION

This application is a continuation of copending, commonly-assigned U.S. patent application Ser. No. 13/484,043, filed May 30, 2012 (allowed), which is a continuation of U.S. patent application Ser. No. 12/116,885, filed May 7, 2008 (now U.S. Pat. No. 8,213,556), which claims the benefit of priority of U.S. Provisional Application No. 60/916,403, entitled "RSSI Estimation for Cellular OFDM Systems" filed on May 7, 2007, each of which is hereby incorporated by reference herein in its respective entirety.

FIELD

The present disclosure relates generally to wireless communications, and in particular to a system and method for estimating signal power for cellular OFDM (Orthogonal Frequency Division Multiplexing) systems.

BACKGROUND

Wireless communication devices such as laptops, cell phones and other devices may use technology such as Worldwide Interoperability for Microwave Access (WiMAX) to enable Internet or other types of wireless communications. WiMAX is a telecommunications technology aimed at providing wireless data over long distances in a variety of ways, from point-to-point links to full mobile cellular type access. Wireless communication devices typically use a technique such as Orthogonal Frequency Division Multiplexing (OFDM), one version of which is Orthogonal Frequency Division Multiple Access (OFDMA), to modulate a communication signal for wireless communication. The principles of OFDM modulation have been in existence for several decades. In recent years, OFDM techniques have been employed in data delivery systems over the phone line, digital radio and television, and wireless networking systems. OFDM spread spectrum techniques distribute data over a large number of carriers that are spaced apart at precise frequencies. OFDM works generally by dividing one high-speed data carrier into multiple low speed sub-carriers which are used for transmission of data in parallel. The sub-carriers are typically the smallest practical allotment of a frequency range in a bandwidth for transmission purposes. The sub-carriers can be assigned to one or more sub-carrier sets. Put another way, the data stream of interest is divided into multiple parallel bit streams known as symbols, each symbol transmitted over a different sub-carrier at a lower effective bit rate. Before final power amplification and transmission, the multi-carrier OFDM symbols are converted into the time domain using Inverse Fast Fourier Transform techniques resulting in a relatively high speed time domain signal with a large peak to average ratio (PAR).

An OFDM preamble symbol is developed to precede a data OFDM symbol. The preamble symbol, also known as a preamble sequence, is a binary sequence that consists of 0s and 1s, and is associated with sub-carrier signals from the set of sub-carriers. A preamble symbol is generated by a base station, which is located in a segment of base stations and has a segment number, using a process in which one of several candidate preamble sequences is chosen based on the base station's IDCell number and segment number. The OFDM communication system uses a preamble sequence for all frame timing synchronization, frequency synchronization, and channel estimation. The OFDM communication system may perform frame timing synchronization, frequency synchronization, and channel estimation using a guard interval and a pilot sub-carrier in addition to the preamble symbol. The preamble sequence is used to transmit known symbols at a beginning part of every frame or data burst, and update estimated time/frequency/channel information at a data transmission part, using information on the guard interval and the pilot sub-carrier.

Once a preamble sequence is chosen, the base station modulates sub-carriers with the chosen preamble sequence, performs IFFT (Inverse Fast Fourier Transform), and adds a cyclic prefix to reduce the inter-symbol interface and inter-channel interface introduced by the multi-path channel through which the signal is propagated.

IEEE 802.11a/g compliant transmission systems achieve high data transmission rates using OFDM encoded symbols mapped to up to 64 QAM (Quadrature Amplitude Modulation) multi-carrier constellations and beyond. In the case of 802.11a/g, there are up to 52 defined sub-carriers or tones, of which 48 sub-carriers or tones are available to carry data (the four remaining are pilot sub-carriers or tones, which carry predetermined data). These sub-carriers are substantially orthogonal to one another, so they can be spaced closer together than in conventional frequency division multiplexing. Mathematically, the integral of the product of any two orthogonal sub-carriers is zero. This property allows the separation of sub-carriers at the receiver without inference from other sub-carriers.

Signal power is estimated in developing RSSI (Receive Signal Strength Indicator) and PCINR (Physical Carrier to Interference and Noise Ratio) for OFDM systems.

RSSI, measured in dBm, is a signal output indicator that is proportional with RF input power. As a result, RSSI signal output can be used to measure RF signal strength on a specific channel and indicate the usage on that channel. RSSI measures the total received power of the preamble of the desired base station. PCINR measures the ratio of average desired signal power to average residual error such as noise and interference. RSSI is used mainly for handover between base stations that have IDCell numbers and segments, and PCINR is used mainly for burst adaptive profile selection and handover between base stations.

Typically, signal power is estimated using either the preamble symbol or the regular OFDM data symbol. One method for estimating signal power using the preamble symbol involves estimating the power of the received signal that corresponds to each preamble sequence. However, typically, estimating received signal power requires estimating the channel gain from the base station for each preamble sequence. Estimating the channel gain creates high level complexity and, therefore, reduces system performance.

SUMMARY

This disclosure is directed in part to systems, apparatus and methods for estimating signal power in a communications link that supports transfer of OFDM symbols modulating data across a plurality of sub-carriers.

In accordance with at least one disclosed embodiment, the power of a received signal of a plurality of receive antennas, the received signal having a plurality of preamble sequences associated with sub-carrier signals received from a plurality of sub-carriers, is estimated by estimating received signal power for at least one preamble sequence at a receive antenna. The power of the received signal corresponding to the preamble sequence associated with selected sub-carriers is estimated by computing a differential received signal for a selected sub-carrier, correlating the differential received signal with a normalized differential transmit signal for the preamble sequence, and extracting an estimate of the power for the preamble sequence received signal power based on the correlation.

In another embodiment, the correlating comprises calculating a correlation value; and adjusting the correlation value to compensate for the number of sub-carriers in the set of sub-carriers and associated with the preamble sequence. In a further embodiment, adjusting further comprises multiplying the magnitude of the correlation value with a scaling factor; and the scaling factor compensates for a difference in a count of sub-carriers in the set of sub-carriers and associated with the preamble sequence and the count excluding a selected sub-carrier.

In yet other embodiments, the systems and methods further comprise correlating a differential received signal developed for one of the set of sub-carriers with normalized differential transmit signals for a selected set of preamble sequences or all of the preamble sequences to obtain correlation values. In a further embodiment, the preamble sequences are associated with a set of adjacent base stations. Power estimates comprising estimates of the power for the preamble sequences are extracted; and a base station is selected for use based on the power estimates.

Moreover, in accordance with at least one disclosed embodiment, the systems and methods comprise summing power estimates for the preamble sequence at other receive antennas to obtain a total estimated signal power corresponding to the preamble sequence.

In accordance with at least one disclosed embodiment, means are disclosed for estimating a power for at least one preamble sequence of a signal received at a selected receive antenna, with the preamble sequence being associated with a base station and a set of sub-carriers. The means for estimating comprises a means for correlating a differential received signal developed for one of the set of sub-carriers with a normalized differential transmit signal for the preamble sequence. The means for estimating further comprises means for extracting an estimate of the power of the preamble sequence based on the correlation.

In accordance with another disclosed embodiment, the means for estimating further comprises a means for calculating a correlation value and a means for adjusting the correlation value to compensate for the number of sub-carriers in the set of sub-carriers and associated with the preamble sequence. In a further embodiment, the means for adjusting comprises a means for multiplying the magnitude of the correlation value with a scaling factor, with the scaling factor compensating for a difference in a count of sub-carriers in the set of sub-carriers and associated with the preamble sequence and the count excluding a selected sub-carrier.

In accordance with a further embodiment, means for estimating further comprises means for correlating a differential received signal developed for one of the set of sub-carriers with normalized differential transmit signals for all sequences or for a selected set of preamble sequences to obtain correlation values for preamble sequences. In a further embodiment, the preamble sequences are associated with a set of adjacent base stations. The means for estimating further comprises means for extracting estimates of the power of the preamble sequences; and a means for selecting a base station for use based on the power estimates.

In accordance with a further embodiment, the means for estimating further comprises means for summing power estimates for the preamble sequence at other receive antennas associated with the received signals to obtain a total estimated signal power corresponding to the at least one preamble sequence.

In accordance with a further embodiment, means for estimating further comprises means for summing power estimates for the preamble sequence at other receive antennas to obtain a total estimated signal power corresponding to the preamble sequence.

In accordance with a further embodiment, a receiver is provided for receiving a signal across a wireless communications link, with a plurality of receive antennas, the signal having a plurality of preamble sequences associated with sub-carrier signals received from a plurality of sub-carriers. The receiver comprises a signal power estimator and an extractor that operate in accordance with the systems and methods described above.

In accordance with a further embodiment, a baseband processor is provided for processing a baseband signal to estimate power of baseband signals for a plurality of receive antennas, the signals having a plurality of preamble sequences associated with sub-carrier signals received from a plurality of sub-carriers. The baseband processor comprises a signal power estimator and an extractor that operate in accordance with the systems and methods described above.

Embodiments described herein overcome the complexity in calculating the signal power for a cellular OFDM system and improve the overall system performance. Additional advantages will be set forth in part in the description which follows, and in part will be obvious from the description, or may be learned by practice of the presently-claimed inventions.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the presently-claimed inventions and together with the description, serve to explain the principles of the presently-claimed inventions.

BRIEF DESCRIPTION OF THE DRAWINGS

FIG. 5 is a chart, showing certain of the preamble modulation series per segment and IDCell for the 1K FFT mode.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

The embodiments herein are described in terms of a WiMAX system, but could be applied to any cellular OFDM system, such as wireless LAN and MAN applications, including IEEE 802.11a/g (and the European alternative HIPERLAN/2). In an illustrative WiMAX system, there are 114 preamble sequences over three sub-carrier sets. Each sub-carrier set transmits 38 preamble sequence subsets.

Figure 1:
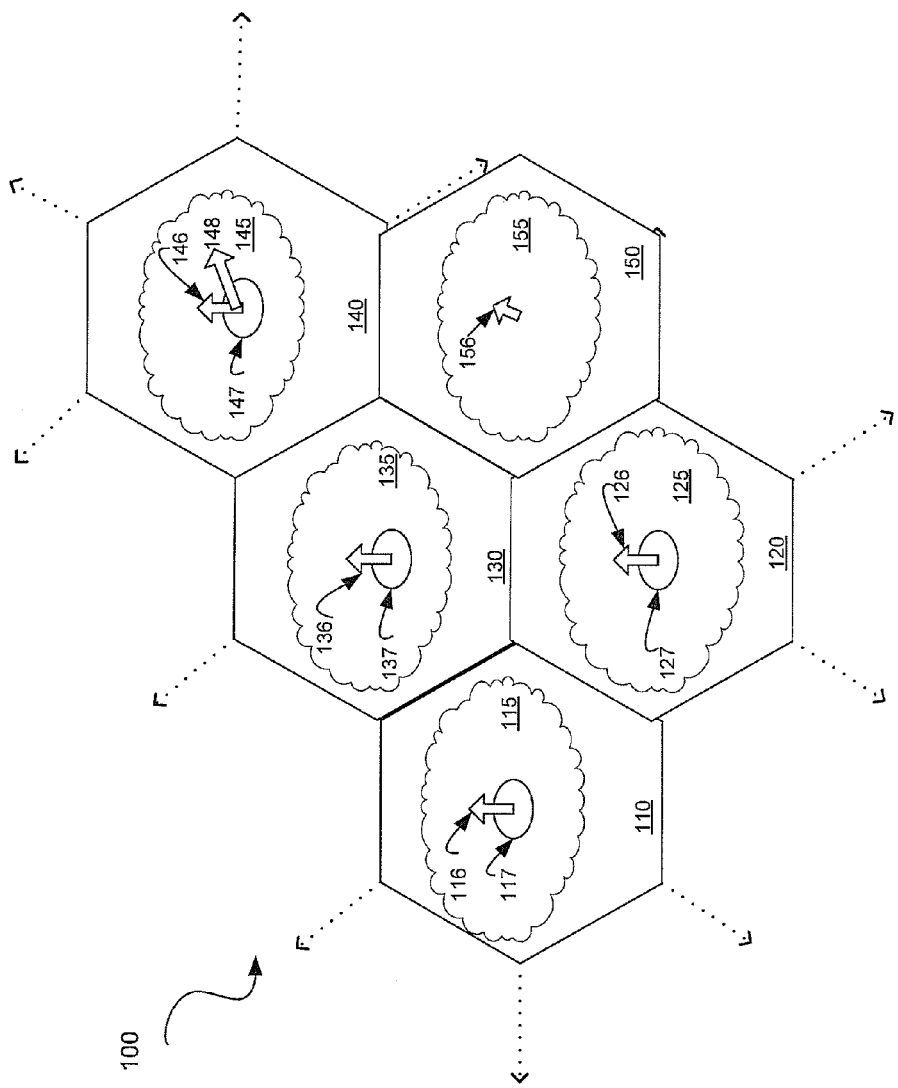
FIG. 1 shows a wireless cellular OFDM communication system, which comprises of a plurality of cells and base stations.

FIG. 1 is a block diagram illustrating selected components of a typical wireless cellular OFDM communication system 100, as might be used in communicating with mobile stations practicing received-power estimation. The network 100 includes a plurality of cells, here cells 110, 120, 130, 140, 150 and a plurality of base stations, here base stations 115, 125, 135, 145, 155. Although only five base stations are shown, in an actual network there can be a different number of base stations. In one implementation, each base station includes at least one base transceiver, and also may include a base controller. In FIG. 1, for example, base transceiver 116 and base controller 117 are included in base station 115; base transceiver 126 and base controller 127 in base station 125; base transceiver 136 and base controller 137 in base station 135; base transceiver 146, base transceiver 148 and base controller 147 in base station 145; and base transceiver 156 in base station 155. A single base controller may control a single base transceiver or a number of base transceivers (such as base controller 147 controlling base transceiver 146, base transceiver 148 or a base controller such as base controller 137 controlling base transceiver 136 and base transceiver 156). The coverage area of network 100 is divided into a number of cells, each having at least one base transceiver (and perhaps a base controller). For purposes of illustration, cells 110, 120, 130, 140 and 150 are shown as not overlapping and as the same size. A typical network has many such cells that, unlike these illustrated in FIG. 1, may vary in size and overlap each other.

Figure 2:
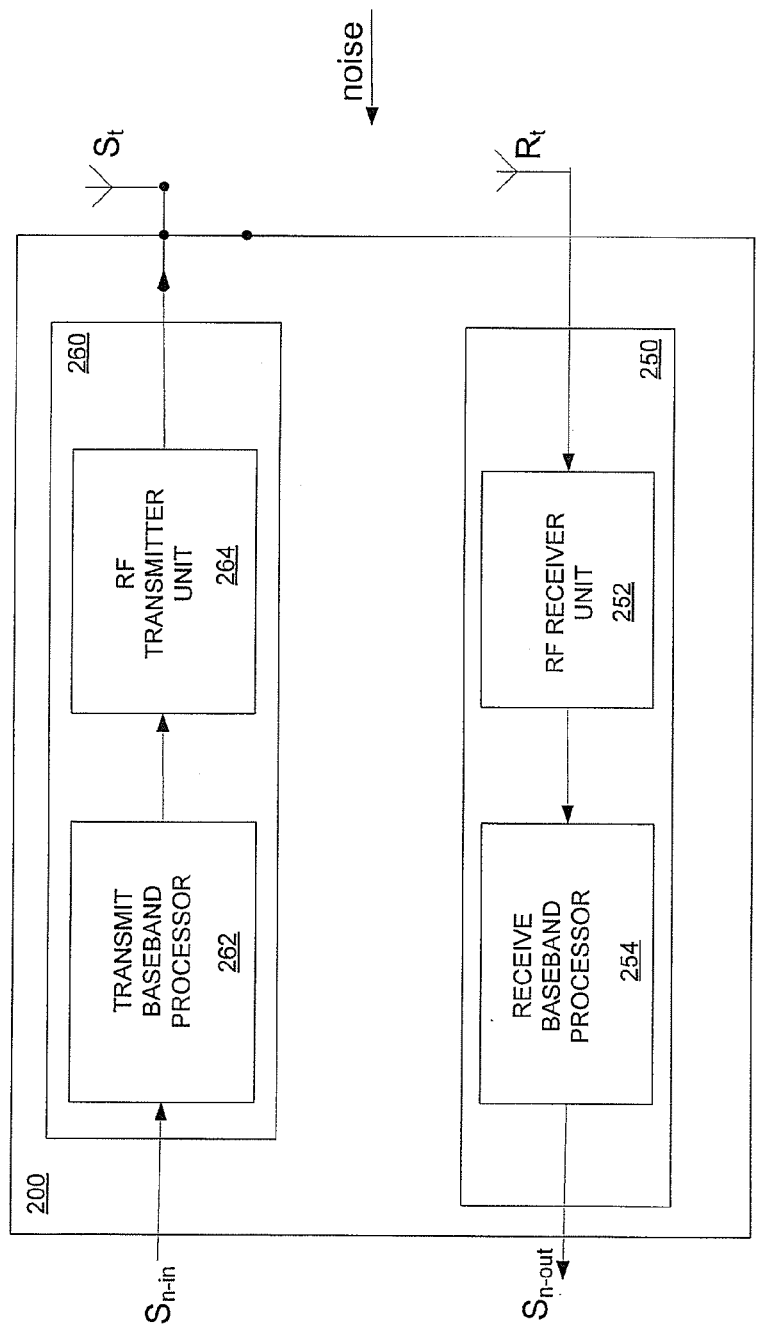
FIG. 2 is a block diagram illustrating a wireless communication transceiver for use with the OFDM digital communication system shown in FIG. 1.

FIG. 2 illustrates a conventional wireless communications transceiver 200. RF signal ($S_{n\text{-}in}$), conveying OFDM encoded symbols, which are serial streams of binary digits, is input to the transmit baseband processor 262 of a transmitter 260. The transmit baseband processor 262 formulates appropriate frame preamble and header information, and OFDM symbol encodes the outbound data to generate one or more complete outbound frames. As the frame or packet is being developed, it is converted into analog form suitable for upconversion and RF transmission by the RF transmitter unit 264. The RF transmitter unit 264 performs routine upconversion and then presents a signal containing at least one frame of OFDM symbols. The data contained in each received frame ($S_t$) are transmitted by antenna to applications and devices being serviced by the transceiver 200.

Data intended for wireless transmission originating, e.g., from the device(s) or application(s) being serviced by the transceiver 200 are input to the receiver 250. The RF receiver unit 252 of the receiver 250 picks up the signal $R_t$, which is a transmitted signal (e.g., a signal $S_t$ transmitted from the device(s) or application(s)) combined with noise that is generated by interference with the transmitted signal $S_t$. The RF receiver unit 252 performs downconversion and automatic gain control of $R_t$. The signal is then rou286ted to receive baseband processor 254. Generally speaking, the receive baseband processor 254 performs symbol demodulation of each inbound frame to recover bitstream data for receiver synchronization (preamble), frame or packet definition (header), or the actual inbound data of interest (payload). The processor 254 then outputs signal ($S_{n\text{-}out}$).

OFDM systems, including 802.11a/g and 802.16 (WiMAX) communications systems, are susceptible to wireless channel fading and multi-path interference, particularly in mobile deployments where intervening terrain and buildings may block or alter line-of-sight reception. To combat this, conventional receiver designs may employ plural geographically dispersed antennas in the hopes that at least one of the antennas can avoid characteristic multi-path interference and channel fading. One common type of receiver including plural antennas is called a selection diversity receiver or simply a diversity receiver. A diversity receiver includes logic to ascertain which one of the RF receive pathways is receiving a best version of an incident signal (based on RSSI analysis), and to select the best version of the incident signal as the received signal.

The transceiver 200 can be adapted to incorporate multiple receive pathways or chains and/or multiple transmit pathways or chains. As noted above and consistent with OFDM systems, the receiver 250 of the transceiver 200 of the embodiment includes a receive baseband processor 254 to demodulate OFDM encoded symbols bearing the data of interest present in the analog baseband signal recovered by the RF receiver unit 252. The receive baseband processor 254 and transmit baseband processor 262 are described in more detail with reference to FIGS. 3A and 3B. In particular, FIG. 3B illustrates a conventional receive baseband processor 254, and FIG. 3A illustrates a corresponding conventional encoding transmit baseband processor 262 to conceptually illustrate the relationship between a received OFDM symbol in relation to its originally transmitted counterpart OFDM symbol.

Figure 3A:
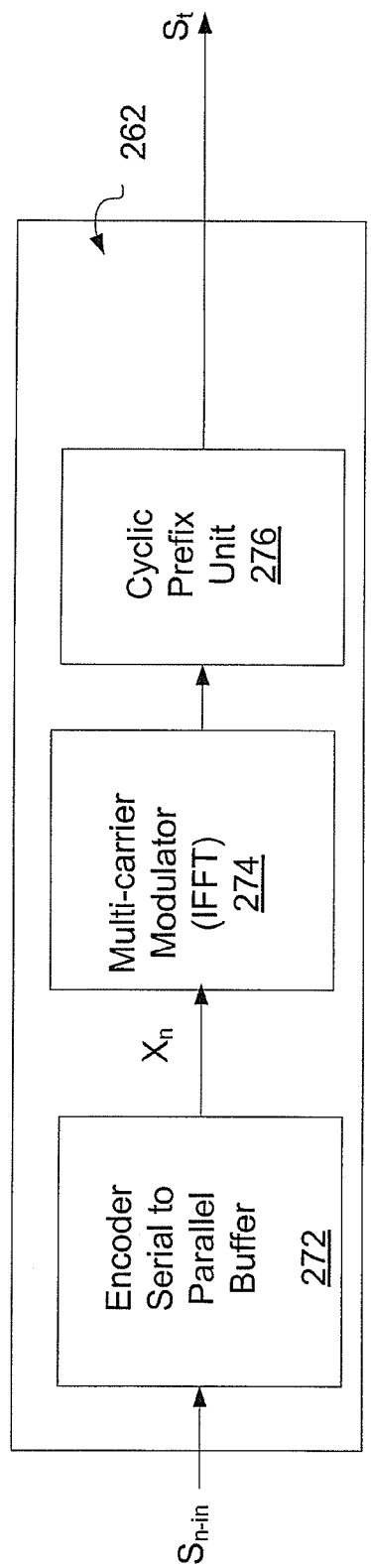
FIG. 3A is a block diagram showing further detail of the transmit baseband processor shown in FIG. 2.
Figure 3B:
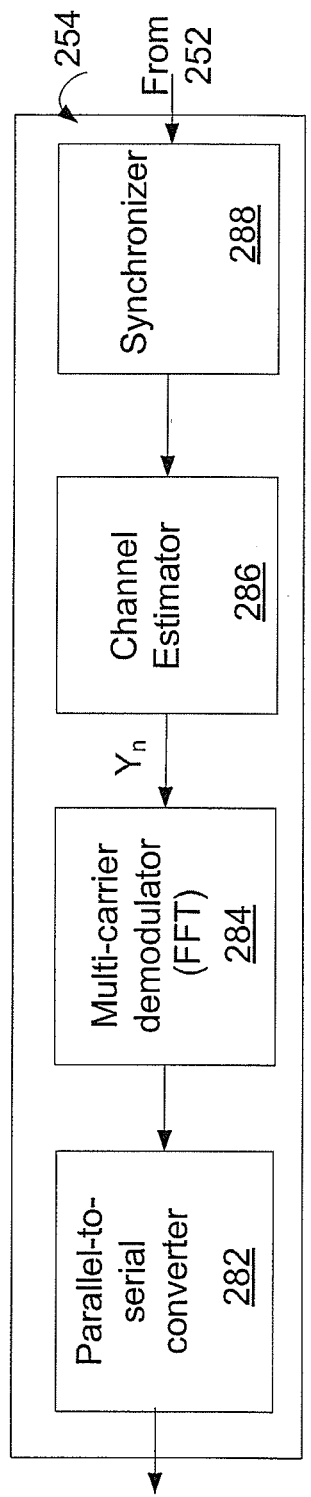
FIG. 3B is a block diagram showing further detail of a conventional receive baseband processor for use in the system shown in FIG. 2.

Referring to FIG. 3A, a received signal is input into a serial-to-parallel buffer 272 of transmit baseband processor 262 in transmitter 260. The serial-to-parallel buffer 272 converts serial symbols so that the number of symbols is matched to the number of inputs of an Inverse Fast Fourier Transformer in the multi-carrier modulator 274. An OFDM system treats the inputted symbols at the transmitter as though the inputted symbols are in the frequency-domain. The IFFT converts the inputted symbols into the time domain. The IFFT takes in N symbols at a time where N is the number of sub-carriers in the system, the symbols having a symbol period of T seconds, and the IFFT basis functions being N orthogonal sinusoids. The IFFT outputs are time-domain signals. The IFFT outputs for all N sinusoids are then summed by multiplexing a wideband signal with several narrowband sub-carrier signals. Thus, the multi-carrier modulator 274 provides a simple way to modulate data onto N orthogonal sub-carriers. A plurality of modulation symbols are transmitted for a one-OFDM symbol period through the multi-carrier modulator 274, and the block of N output sub-carriers make up a single OFDM symbol. The length of the OFDM symbol is NT where T is the IFFT input symbol period mentioned above.

Then, the multi-carrier modulator 274 inserts a guard interval into the IFFT-transformed data. Inserting a guard interval will insert null data for a predetermined period into the IFFT-transformed data in order to minimize inter-symbol interference. The signal may then be input to a cyclic prefix unit 276.

In an OFDM communication system, interference between a previous OFDM symbol and a current OFDM symbol might occur. While having a guard interval in the signal will reduce the probability of interference, if a receiver incorrectly estimates a start point of an OFDM symbol, interference can still occur between sub-carriers, causing an increase in an error probability of a received OFDM symbol. Therefore, a "cyclic prefix" may be provided for the guard interval to further reduce the error probability. At the cyclic prefix unit 276, a characteristic of the guard interval is used to acquire time/frequency synchronization of a received OFDM symbol. The characteristic may be created by copying a part of the one time-domain OFDM symbol, e.g., a beginning part or a last part of one OFDM symbol, and then repeatedly arranging the copied OFDM symbols. Alternatively, a "cyclic postfix" may be used to reduce error probability. A cyclic postfix unit (not shown) may be substituted for the cyclic prefix unit 276 for copying the first 1/n bits in a time-domain OFDM symbol and inserting the copied bits into an effective OFDM symbol. A digital-to-analog converter (not shown) converts a signal output from the cyclic prefix unit 276 into an analog signal which is then output as output signal $S_r$. The output signal $S_t$ may be provided to a radio frequency processor such as the RF receiver unit 252 in the receiver 250.

Typically, radio frequency (RF) systems receive distorted transmitted signal. A multi-path channel, not shown, causes a time dispersion of the transmitted signal resulting in the overlap of the various transmitted symbols at the receiver. This is referred to as inter-symbol interference (ISI), which, if left uncompensated, may cause high error rates. Due to the carrier frequency difference between the transmitter and receiver, each signal sample at time t contains an unknown phase factor. This unknown phase factor must be estimated and compensated for each sample before Fast Fourier Transform at the receiver since otherwise the orthogonality between sub-carriers is lost.

The conventional receive baseband processor 254 for use in the receiver 250 is shown in more detail in FIG. 3B. The receive baseband processor 254 has a time/frequency synchronizer 288 to perform the compensation. The time/frequency synchronizer 288 acquires the received distorted transmission signal and synchronizes the signal samples forming the signal. The signal is then passed to the channel estimator 286, which uses a preamble sequence previously set between the transmitter and the receiver to perform channel estimation. The signal is then passed to multi-carrier demodulator 284, where the channel-estimated signal is demodulated into frequency-domain symbols through Fast Fourier Transform (FFT). The multi-carrier demodulator 284 is used to process the received signal from the time domain into the frequency domain. After demodulating the channel-estimated signal into frequency-domain symbols, the symbols are passed to the parallel-to-serial converter 282, which performs channel decoding and source decoding to thereby decode the demodulated symbols into information data.

FIG. 5 illustrates possible preamble sequences, identified by indices or indexes 310, for segments 330 and IDcells 320 for the 1K FFT mode. In one implementation, preamble sequences are binary sequences that consist of 0s and 1s or hexadecimal sequences. The length and number of sequences are determined by the FFT modes. For example, there are 114 preamble sequences for 512 and 1024 FFT modes. 512 FFT mode has 143 bit-long sequences and 1024 FFT mode has 284 bit-long sequences. In theory, for a given mobile station, the total number of preamble sequences in a WIMAX system is 114, meaning there are 114 base stations that may transmit. Base stations are located in segments that have a segment number. Each base station (e.g. base station 115, 125, 135, 145 . . . ) will choose one preamble sequence. For example, base station 115, having IDCell number 0 and segment number 0, chooses one of 114 potential preamble sequences based on its IDCell number 0 and segment number 0. Base stations adjacent to base station 115 (e.g., base stations 125, 135) will choose different preamble sequences. Based on the chosen different preamble sequences, the system can differentiate signals transmitted from different base stations.

Typically, once the preamble sequence is chosen, the base station modulates sub-carriers with the chosen preamble sequence, performs IFFT, and adds a cyclic prefix as described above with reference to FIG. 3A.

The received signal in the frequency domain Y[k] at antennas 1 to R at sub-carrier k can be expressed as:

$$Y_r[k] = \sum_{i=0}^{I-1} H_{r,i}[k] X_i[k] + Z_r[k] \quad [1]$$

where:
k is the sub-carrier index;
i is the preamble sequence index;
I is the total number of distinct preamble sequences;
$Z_r[k]$ is the noise of antenna r at sub-carrier k;
$H_{r,i}[k]$ is the channel gain from the base station with i-th preamble sequence to antenna r at sub-carrier k; and
$X_i[k]$ is the transmit signal corresponding to preamble sequence i at sub-carrier k.

For WiMAX, $X_i[k]$ is a transmit signal that has a value of +1 or −1 at the preamble sub-carrier k that is in a set of sub-carriers corresponding to a given segment, and has a value of 0 at other sub-carriers.

Typically, the power (or signal power) of the received signal that corresponds to each preamble sequence i is estimated at each received antenna r using the following RSSI equation:

$$SignalPower_{r,i} = \sum_{k=0}^{N-1} |H_{r,i}[k] X_i[k]|^2 \quad [2]$$

Further, the total signal power for preamble sequence i at all the received antennas is calculated as:

$$SignalPower_i = \sum_{r=1}^{R} SignalPower_{r,i} \quad [3]$$

$H_{r,i}[k]$ is an unknown variable in equation [2] above and is estimated before estimating Signal Power$_{r,i}$. Typically, estimating $H_{r,i}[k]$ for each preamble sequence i creates high level complexity and therefore reduces the performance of the system.

Figure 4:
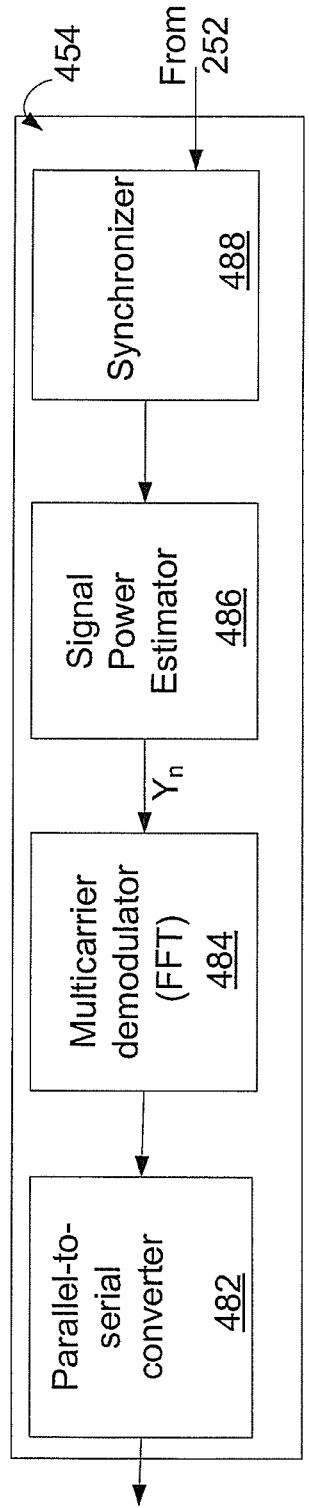
FIG. 4 is a block diagram of a receive baseband processor for use in the system shown in FIG. 2.

In embodiments described herein, an estimate of the signal power for a preamble sequence i may be obtained by estimating signal power in a communications link that supports transfer of OFDM symbols modulating data across a plurality of sub-carriers. As shown in FIG. 4, a receive baseband processor 454 may be provided for estimating the power of received signals. The receive baseband processor 454 is similar to the conventional receive baseband processor 254 shown in FIG. 3B, and may be used in place thereof in the receiver 250 of FIG. 2. As with receive baseband processor 254, the receive baseband processor 454 has a synchronizer 488, a multi-carrier demodulator 484 and a parallel-to-serial converter 482, which are similar to the synchronizer 288, multi-carrier demodulator 284 and parallel-to-serial converter 282, described above. However, instead of performing channel estimation using channel estimator 286 as shown in FIG. 3B, a signal power estimator 486 is provided to perform a signal power estimation. The signal power estimator 486 bases its estimate on a correlation between the transmit signal power for the chosen preamble sequence at the associated sub-carrier and the received signal power at that sub-carrier.

Figure 6:
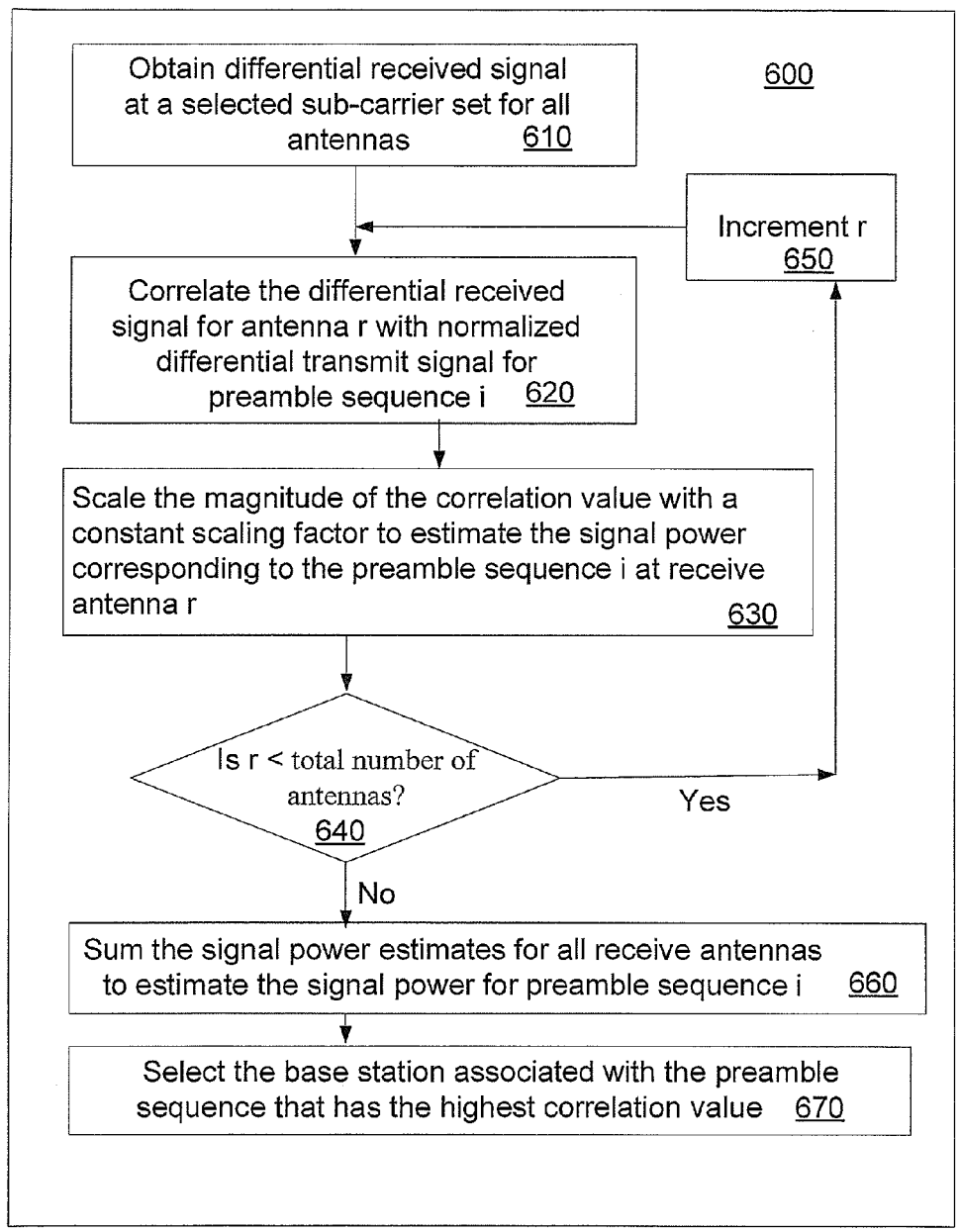
FIG. 6 is a flow diagram illustrating a process of estimating the power of a received OFDM signal.

FIG. 6 is an example of a flowchart showing a routine 600 for implementing a method for estimating signal power of a received signal, which is performed by a signal power estimator (e.g., signal power estimator 486), consistent with at least one embodiment. The routine 600 starts with a block 610 to obtain or derive the differential received signal at a selected sub-carrier k for all antennas. Block 610 may also be known as a differential operation performed by a differentiator. $M_r[k]$ is obtained in accordance with the following equation:

$$M_r[k] = Y_r^*[b]Y_r[k] \quad [4]$$

where:
b is another sub-carrier within the set of sub-carriers for antenna r; and
$Y^*_r[b]$ is the complex conjugate of $Y_r[b]$.

The differential operation represented by equation [4] also constitutes a scaling operation. Signal power varies over sub-carriers. However, the signal power variation over consecutive sub-carriers is very small. Assuming that the variation between sub-carriers k and b is very small, the multiplication of $Y_r[k]$ and $Y^*_r[b]$ corresponds to taking the magnitude square of $Y_r[k]$.

The routine 600 may then proceed to a block 620 for correlating the differential received signal associated with the selected sub-carrier k for an antenna r with the normalized differential transmit signal for preamble sequence i. Block 620 may also be known as a correlation unit, performing a cross-correlation operation.

The cross-correlation operation is performed for every preamble sequence i in the set of the sub-carriers ($P_i$) using preamble sequence i in accordance with the equation:

$$SignalPower_{est,r,i} = \frac{N_{used}}{N_{used}-1} \left| \sum_{k \in \tilde{P}_i} M_r[k] \frac{D_i^*[k]}{|D_i[k]|} \right| \quad [5]$$

where:
$D_i[k]$ is the differential transmit signal for preamble sequence i; and is defined as:

$$D_j[k] = X_j[k]X_j^*[b]$$

$D^*_i[k]$ is the complex conjugate of $D_i[k]$;
$P_i$ is the set of sub-carriers used for preamble sequence i;
$\tilde{P}_i$ is $P_i$, excluding the subcarrier having the highest sub-carrier index;
$N_{used}$ is the total number of sub-carriers used for each preamble sequence, i.e., the size of $P_i$.

The differential received signal $M_r[k]$, which consists of all the preamble sequences over sub-carrier k at antenna r, is correlated with each of the normalized differential transmit signals for preamble sequences over sub-carrier k at antenna r. For example, by correlating the preamble sequence (i=1) with the normalized differential received signal ($M_r[k]$), and the correlation value estimate for the signal power corresponding to preamble sequence 1 is obtained.

The correlation operation performed by block 620 may be limited to correlating $M_r[k]$ with $D_i[k]$ because of the low cross-correlations between $M_r[k]$ and the differential transmit signals for other preamble sequences associated with other sub-carriers in the set $P_j$.

In signal processing, the cross-correlation (or sometimes "cross-covariance") is a measure of similarity of two signals, commonly used to find features in an unknown signal by comparing the unknown signal to a known signal. It may be seen that the differential transmit signals for all of the preamble sequences i at antenna r have low cross-correlations, when compared to the square of the differential transmit signal for a preamble sequence i at antenna r.

Specifically, the extent of the cross-correlation may be seen with the following equation:

$$\max_{i,j \neq i} \left\{ \frac{\left| \sum_{k \in P_i} D_i[k]D_j^*[k] \right|}{\sum_{k \in P_i} |D_i[k]|^2} \right\} \approx 0.1731 \text{ for 1024 FFT} \quad [6]$$

Equation [6] shows that the correlation between normalized differential transmit signals for two preamble sequences is almost 0, when compared to the squared differential transmit signal for one of the preamble sequences. Therefore, when correlating $M_r[k]$ with the differential transmit signals for other preamble sequences associated with other sub-carriers in the set $P_i$, $D_i[k]$ may be substituted for the differential transmit signals for other preamble sequences associated with other sub-carriers in the set $P_i$.

The routine 600 may then proceed to a block 630 for scaling the magnitude of the correlation value calculated in block 620. Block 620 may also be known as a scaling unit, performing a scaling operation. The scaling unit takes the magnitude of the correlation value and multiplies it with a scaling factor to compensate for the number of sub-carriers used for preamble sequence i. Specifically, the scaling factor takes into account the difference in the number of sub-carriers between the set of the sub-carriers used for preamble sequence i and the set of sub-carriers used for preamble sequence i excluding the sub-carrier ($P_i$) with the highest sub-carrier index.

If, at block 640, it is determined that the signal power estimate has not yet been extracted for all of the receive antennas, the routine 600 proceeds to block 650 to increment r and proceed again through blocks 620 and 630. If, at block 640, it is determined that the signal power estimate for all of the receive antennas has been extracted, the routine 600 proceeds to block 660, which is also known as the calculator, for summing the estimated signal powers for the preamble sequence i for all of the receive antennas to estimate the total signal power for the chosen preamble sequence i. The following algorithm is used at block 680:

$$SignalPower_{est,i} = \sum_{r=1}^{R} SignalPower_{est,r,i} \quad [7]$$

The routine 600 may then proceed to block 660 for selecting the base station that corresponds to the preamble sequence that has the highest correlation value. Block 660 may also be known as the selector. Base stations are selected after estimation of the power corresponding to the preamble sequence i within a candidate set I. The candidate set I may have just one element, multiple elements, or all preamble sequence indices. Further, the base station selection is not conducted until the power for all receive antennas has been calculated.

After exiting block 670, the routine 600 then ends.

The embodiments described herein have been presented for purposes of illustration and description. It is not intended to be exhaustive or to limit the presently-claimed inventions to the precise forms disclosed. Other embodiments will be apparent from consideration of the specification and practice of the embodiments disclosed herein. For example, the embodiments described herein would be applicable to other non-WiMAX systems that use a preamble sequence structure. It is intended that the specification and examples be considered as exemplary only, with a true scope of the claimed inventions being indicated by the following claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps set forth in the specification should not be construed as limitations on the claims.

What is claimed is:

1. A method for estimating a power of a received signal, the method comprising:
    generating a differential received signal by multiplying the received signal with a factor;
    calculating a correlation value based on the differential received signal and a normalized transmit signal comprising a predetermined sequence; and
    scaling a magnitude of the correlation value by a scaling factor to estimate the power of the received signal.

2. The method of claim 1, wherein the differential received signal is associated with a set of sub-carriers, and wherein the predetermined sequence is associated with a base station and the set of sub-carriers.

3. The method of claim 1 further comprising adjusting the correlation value to compensate for a number of sub-carriers in the set of sub-carriers and associated with the predetermined sequence.

4. The method of claim 1, wherein the scaling factor compensates for a difference in a count of sub-carriers in the set of sub-carriers and associated with the predetermined sequence and the count excluding a selected sub-carrier.

5. The method of claim 1 further comprising estimating power of signals received by a plurality of receive antennas by summing the estimated power of the received signal at other receive antennas to obtain a total estimated signal power.

6. The method of claim 2 further comprising:
    correlating the differential received signal with normalized transmit signals for a selected set of predetermined sequences to obtain correlation values for predetermined sequences in the selected set;
    extracting power estimates comprising estimates of the power for the selected set of predetermined sequences; and
    selecting a base station for use based on the power estimates.

7. The method of claim 1, wherein the power of the received signal at a selected receive antenna comprises SignalPower$_{est,\ r,\ i}$, and wherein correlating the differential received signal with the normalized transmit signal is performed by using M$_r$[k] according to the equation:

$$SignalPower_{est,r,i} = \frac{N_{used}}{N_{used} - 1} \left| \sum_{k \in P_i} M_r[k] \frac{D_i^*[k]}{|D_i[k]|} \right|$$

where:
D$_i$[k] represents the transmit signal for predetermined sequence i at a sub-carrier k for an antenna r;
D*$_i$[k] represents the complex conjugate of D$_i$[k];
P$_i$ is the set of sub-carriers; and
N$_{used}$ is a total number of sub-carriers for each predetermined sequence.

8. A system for estimating a power of a received signal, the system comprising:
    a generator for generating a differential received signal by multiplying the received signal with a factor;
    a calculator for calculating a correlation value based on the differential received signal and a normalized transmit signal having a predetermined sequence; and
    a multiplier for scaling a magnitude of the correlation value by a scaling factor to estimate the power of the received signal.

9. The system of claim 8, wherein the differential received signal is associated with a set of sub-carriers, and wherein the predetermined sequence is associated with a base station and the set of sub-carriers.

10. The system of claim 8 further comprising an adjustment unit for adjusting the correlation value to compensate for a number of sub-carriers in the set of sub-carriers and associated with the predetermined sequence.

11. The system of claim 8, wherein the scaling factor compensates for a difference in a count of sub-carriers in the set of sub-carriers and associated with the predetermined sequence and the count excluding a selected sub-carrier.

12. The system of claim 8 further comprising:
    a signal power estimator for estimating power of signals received by a plurality of receive antennas; and
    a calculator for summing the estimated power of the received signal at other receive antennas to obtain a total estimated signal power.

13. The system of claim 9 further comprising:
    a correlator for correlating the differential received signal with normalized transmit signals for a selected set of predetermined sequences to obtain correlation values for predetermined sequences in the selected set;
    an extractor for extracting power estimates comprising estimates of the power for the selected set of predetermined sequences; and
    a base station selector for selecting a base station for use based on the power estimates.

14. The system of claim 8, wherein the power of the received signal at a selected receive antenna comprises SignalPower$_{est,\ r,\ i}$, and wherein correlating the differential received signal with the normalized transmit signal is performed by using M$_r$[k] according to the equation:

$$SignalPower_{est,r,i} = \frac{N_{used}}{N_{used} - 1} \left| \sum_{k \in P_i} M_r[k] \frac{D_i^*[k]}{|D_i[k]|} \right|$$

where:

$D_i[k]$ represents the transmit signal for predetermined sequence i at a sub-carrier k for an antenna r;

$D^*_i[k]$ represents the complex conjugate of $D_i[k]$;

$P_i$ is the set of sub-carriers; and $N_{used}$ is a total number of sub-carriers for each predetermined sequence.

15. A receiver for receiving a signal, wherein the receiver is operable to estimate a power of the received signal, the receiver comprising:
- a generator for generating a differential received signal by multiplying the received signal with a factor;
- a calculator for calculating a correlation value based on the differential received signal and a normalized transmit signal having a predetermined sequence; and
- a multiplier for scaling a magnitude of the correlation value by a scaling factor to estimate the power of the received signal.

16. The receiver of claim 15, wherein the differential received signal is associated with a set of sub-carriers, and wherein the predetermined sequence is associated with a base station and the set of sub-carriers.

17. The receiver of claim 15 further comprising an adjustment unit for adjusting the correlation value to compensate for a number of sub-carriers in the set of sub-carriers and associated with the predetermined sequence.

18. The receiver of claim 15, wherein the scaling factor compensates for a difference in a count of sub-carriers in the set of sub-carriers and associated with the predetermined sequence and the count excluding a selected sub-carrier.

19. The receiver of claim 15 further comprising:
- a signal power estimator for estimating power of signals received by a plurality of receive antennas; and
- a calculator for summing the estimated power of the received signal at other receive antennas to obtain a total estimated signal power.

20. The receiver of claim 16 further comprising:
- a correlator for correlating the differential received signal with normalized transmit signals for a selected set of predetermined sequences to obtain correlation values for predetermined sequences in the selected set;
- an extractor for extracting power estimates comprising estimates of the power for the selected set of predetermined sequences; and
- a base station selector for selecting a base station for use based on the power estimates.

\* \* \* \* \*